United States Patent [19]

Battle

[11] 4,061,903

[45] Dec. 6, 1977

[54] DIGITAL COORDINATOR WITH SMOOTH TRANSITION FOR OFFSET CHANGES

[75] Inventor: Francis L. Battle, Austin, Tex.

[73] Assignee: Gulf & Western Industries, Inc., New York, N.Y.

[21] Appl. No.: 710,288

[22] Filed: July 30, 1976

Related U.S. Application Data

[63] Continuation-in-part of Ser. No. 663,580, March 3, 1976.

[51] Int. Cl.[2] .............................................. G06F 15/48

[52] U.S. Cl. ...................................... 364/436; 340/40; 340/41 R

[58] Field of Search ..................... 235/150.24; 340/40, 340/41 R

[56] References Cited

U.S. PATENT DOCUMENTS

| | | | |
|---|---|---|---|
| 3,252,134 | 5/1966 | Auer et al. | 235/150.24 X |
| 3,305,828 | 2/1967 | Auer et al. | 340/40 |
| 3,483,508 | 12/1969 | Cress et al. | 340/40 |
| 3,525,980 | 8/1970 | Schmidt et al. | 340/41 |
| 3,537,067 | 10/1970 | Ishikawa et al. | 340/40 |
| 3,551,654 | 12/1970 | Arlen et al. | 235/150.24 |

*Primary Examiner*—R. Stephen Dildine, Jr.

*Attorney, Agent, or Firm*—Meyer, Tilberry & Body

[57] ABSTRACT

An improvement in a digital coordinator of the type used for creating a background cycle defined by a series of control pulses repeatedly cycled between a first number, $N_1$, and a second number, $N_2$, with the time space between the $N_1$ control pulse and the $N_2$ control pulse being a background cycle length. This type of coordinator comprises a primary pulse counter means incremented by input counting pulses for creating one in a series of control pulses in response to a selected number of input counting pulses, wherein the input counting pulses have a selected frequency for determining the cycle speed of progression of the control pulses in successive count positions between the $N_1$ control pulse and the $N_2$ control pulse of a given background cycle, and shifting means for shifting the $N_1$ control pulse with respect to time to correspond in time with a synchronization offset signal. The improvement in this type of coordinator includes means for digitally measuring the time period between the $N_1$ control pulse and the occurrence of one of the synchronization offset signals during a given background cycle and further means for stopping the control pulses from the primary counter for the measured time period.

37 Claims, 5 Drawing Figures

DIGITAL COORDINATOR WITH SMOOTH TRANSITION FOR OFFSET CHANGES

RELATED APPLICATION

This application is a continuation-in-part of prior application Ser. No. 663,580 filed on Mar. 3, 1976.

In addition, said prior application is incorporated by reference herein for the purpose of setting forth additional background of the present invention.

BACKGROUND OF THE INVENTION

This invention relates to the art of traffic control devices and more particularly to an improvement in a digital coordinator for coordinating the signalization at a given intersection in a controlled traffic system.

The invention is particularly applicable for use in coordinating a multi-phase traffic flow pattern at a given intersection which is controlled by a remote master controller and it will be described with particular reference thereto; however, it is appreciated that the invention has much broader applications and may be used as a coordinator for various traffic control systems.

As is well known, traffic control systems often employ a master controller which can control the signalization at numerous intersections within a network or pattern of related traffic flow. Generally these systems utilize a coordinator at each intersection, which coordinator determines the background cycle length of the signalization and certain programmed functions for the controlled intersection. The master controller provides control information to the coordinator which, in turn, regulates the local controller in accordance with this and other input information. These coordinators include a means for determining the cycle length or duration for processing the total signalization cycle at the controlled intersection. In addition, outputs of the coordinator determine the length, spacing and existence of certain functions at the controlled intersection. Generally, this type of traffic system requires a means for providing a selected time offset of the background cycle of one intersection with respect to the background cycle of other intersections. Offset of a background cycle allows traffic flow in a more efficient manner along a continuous traffic flow pattern or grid. For instance, at certain times during the day, or during certain traffic conditions, it is necessary to change the offset at spaced intersections. To do this, a master synchronization pulse is created at the master controller. Each of the intersections then employs a selected time delay after the master pulse before its signalization cycle is initiated. As traffic conditions change, the offset is changed by the master controller to optimize traffic flow. This type of coordinated system is well known and is generally in use in traffic control systems.

In accordance with the present invention there is provided an improvement in the invention described and claimed in my prior application Ser. No. 663,580, filed Mar. 3, 1976. In the prior application a coordinator of the type described above, i.e. for creating a background cycle time used to control logic conditions for selected output circuits, includes a pulse counter for counting between $N_1$ or 0 and $N_2$ or 99 upon receipt of counting pulses. Output means are disclosed for creating signals upon counting to several of the digits in the range of 0 to 99. This previously described coordinator also includes means for controlling the frequency of the counting pulses to a frequency of one hundred divided by the time of the desired background cycle is seconds and decoding means for creating the selected output logic conditions in the output circuits when the counter counts to a selected number in the range of 0 to 99. In this manner, there is created a background cycle which is advanced by a selected percentage between 0 and 99 in a digital fashion. This incremented background cycle is divided into one hundred increments representing percentages of the background cycle, irrespective of its adjusted time or length of the cycle. The cycle time or duration can be adjusted by changing the input counting frequency of the pulse counter.

The present invention relates to an improvement in the basic digital coordinator described in the previously mentioned copending application. In accordance with the present invention, there is provided a digital system for synchronizing the background cycle with respect to a signalization offset signal sent from the master controller. It is often necessary to adjust the offset of a traffic signalization cycle with respect to other coordinated traffic signals. In such a system, an offset signal is created at the various intersections which offset signal has a preselected time spacing with respect to a master synchronization signal. During normal operations, the background cycle of the digital coordinator corresponds with the existing offset signal. If the offset signal is changed, the digitally produced background cycle no longer corresponds to, i.e. is not synchronized with, the new position of the offset signal. Thus, it is necessary to adjust the background cycle to again correspond to, or be synchronized with, the new position of the offset signal. In addition, if for any reason, there is drift in the background cycle, it is advisable to readjust the background cycle to correspond with the desired offset determined by the offset signal from the master controller.

The present invention relates to an improvement in a digital controller wherein a changed relative time position of the offset signal from the master controller can be acknowledged and the background signal can be shifted to the desired relative time position without undue interruption of signalization at any given intersection. In other words, when the offset signal is substantially spaced from the start of an existing background cycle, resynchronization is obtained by digitally synchronizing subsequent background cycles in a gradual manner and without unduly changing a single signalization background cycle.

In accordance with the present invention, there is provided an improvement in a digital coordinator of the type described above, which improvement includes means for digitally measuring the time period between the $N_1$, or first, control pulse of the background cycle and the occurrence of one of the signalization offset signals during a given background cycle and then means for stopping the control pulses to the main cycle counter for the measured time period. In addition, this stopping action for the pulse counter can occur only when the signalization offset signal is within a preselected percentage range of the initial pulse in an existing background cycle. Otherwise, there is provided means for increasing or decreasing the pulse counting rate used in creating the background cycle to shift the background cycle gradually toward a synchronization condition.

By utilizing the present invention, a change in offset can be gradually compensated for by the present invention to shift gradually the existing background cycle to ultimately correspond with the signalization offset signal.

The primary object of the present invention is the provision of a system in a digital traffic coordinator, which system digitally synchronizes the background cycle with a signalization offset signal with a gradual operation, except near actual synchronization conditions.

Another object of the present invention is the provision of a system as described above, which system can be adapted to various digital coordinators for use in traffic control.

These and other objects and advantages will become apparent from the following description taken together with the accompanying drawings.

THE PREFERRED EMBODIMENT

Figures 1, 3, 4, 5:
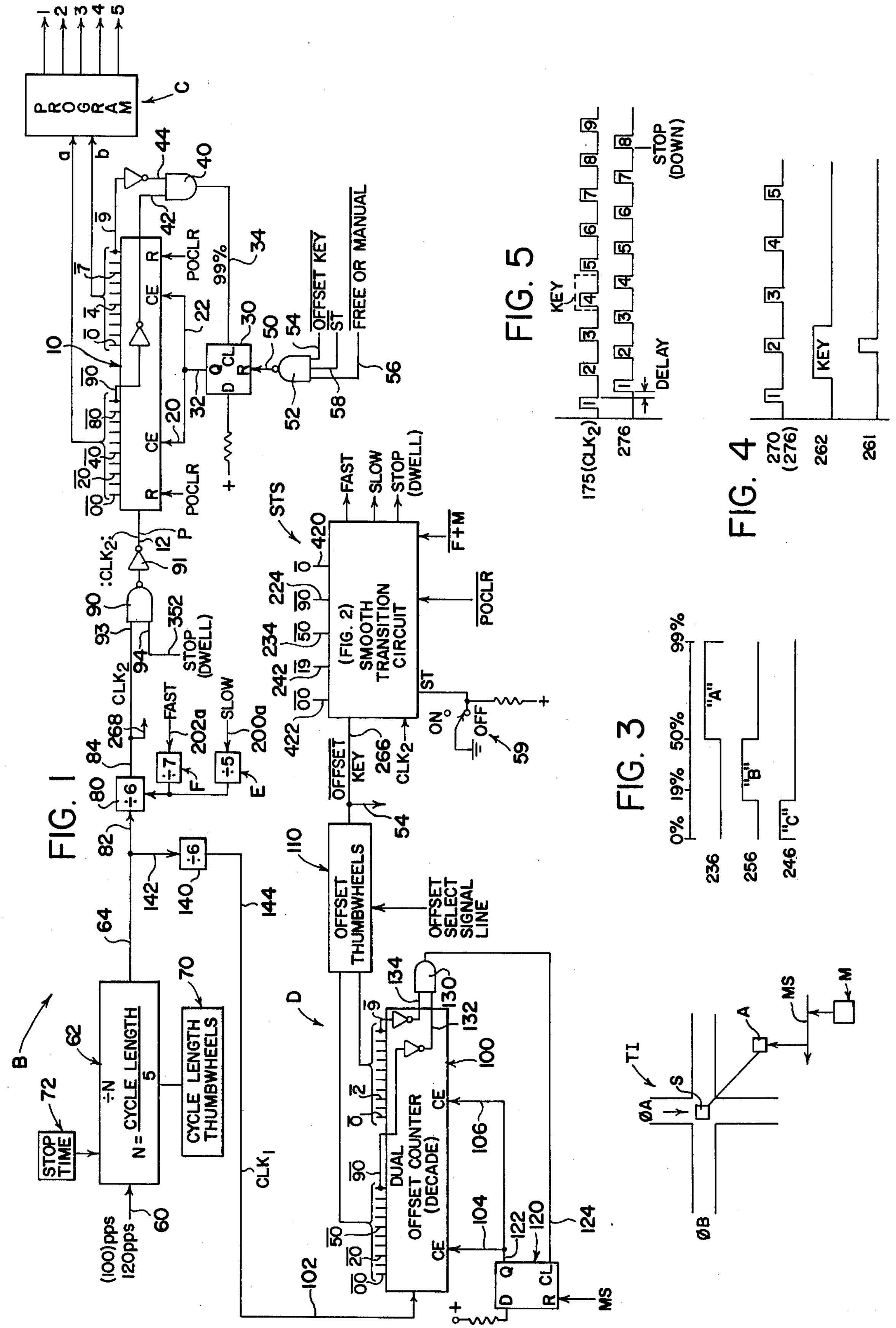
FIG. 1 is a schematic logic diagram illustrating the preferred embodiment of the present invention.
FIG. 3 is a chart of a background cycle divided in percentages and indicating the logic condition at various percentage locations in the background cycle irrespective of cycle length.
FIG. 4 is a pulse chart illustrating the logic summation of a signalization offset pulse and a timing pulse used therewith; and, FIG. 5 is a pulse diagram illustrating the relationship of an offset key to both the main clock and the delayed clock used in the preferred embodiment of the present invention for operating a control counter as illustrated in FIG. 1.

Referring now to the drawings wherein the showings are for the purpose of illustrating a preferred embodiment of the invention only, and not for the purpose of limiting same, FIG. 1 shows a digital coordinator A used to control a traffic signal S at a traffic intersection TI. This schematically illustrated intersection includes two separate traffic phases which vary according to the configuration of the intersection and are shown only for the purposes of illustrating a representative type of intersection to be controlled by coordinator A. The basic features of the coordinator A are set forth in my prior application Ser. No. 663,580 incorporated by reference herein. A master control unit M remotely located with respect to the intersection TI includes certain output lines which can direct a master synchronization pulse, MS, a signalization offset select signal and other pulses or signals to the various coordinators A located at different intersections in a traffic system. A variety of traffic system configurations can employ a coordinator constructed in accordance with the present invention. In the preferred embodiment, coordinator A includes a driving circuit B, a programmed output circuit, or module C, an offset control circuit D, which receives the master synchronize pulse MS from master controller M, and a smooth transition system STS, forming the basic improvement of the present invention. A main cycle length pulse counter 10 is provided with two stages. The first stage counts units between 0–9 and the second stage counts tens between 00 and 90. These two counters are connected in decade so that counter 10 counts between 0 and 99, as input counting pulses are received at input 12. Counter 10 can roll over to all zeros after 99 and continue the cycle length counting for a new cycle. However, in the illustrating embodiment of counter 10, when count position 99 has been reached, counter 10 is inhibited at terminals CE by a logic 1 in lines 20, 22. A logic 0 in these lines then allows a new cycle to be processed. A continuous logic 0 in these lines allows recycling of counter 10. Counter 10 produces one hundred output pulses for each background cycle, which divide the background cycle into one hundred equal parts or percentages. The one hundred increments are designated as cycle length percentages. In the illustrated embodiment the group of leads *a* is designated tens and the group of leads *b* is designated units to produce the 0 to 99 outputs or count positions. Thus, the logic on leads *a, b* is a one out of ten logic which changes at each 1 percent increment during the background cycle. Of course, other increments could be used for dividing the output of counter 10. For instance, the increment could be $\frac{1}{2}\%$, $\frac{1}{4}\%$, 2%, etc. This would change the required driving frequency. Counter 10 is enabled by a logic 0 in the two lines 20, 22, which lines are controlled by a dual stage unit, such as flipflop 30. This provides an arrangement for stopping the counter 10 at the end of its counting function. When the output of counter 10 reaches the binary coded designation for the count number or percentage 99, the logic in line 34 clocks a logic 1 into control line 32, which is connected to the Q terminal of flip-flop 30. This flip-flop can be considered as a shifting unit for shifting counter 10 back into the zero position with a logic 0 at terminals $\overline{0}$ and $\overline{00}$ for the next successive cycle timing function. Flip-flop 30 includes a D terminal connected to a positive power supply. Thus, a logic 1 is applied to the D terminal. The Q line 32 is connected to enable lines 20, 22 so that when a logic 0 appears in line 32, the two counter banks in counter 10 are enabled. Clock line 34 for flipflop 30 receives a pulse when the output of counter 10 reaches the number 99 or a units 9 and a tens 90. This can be provided by various arrangements. In the illustrated embodiment, an AND gate 40 has inputs 42, 44 connected to the 9 line of both counter sections to produce clocking logic when counter 10 reaches 99 or 9 and 90. Since the pulse on the lines a, b are inverted logic, inverters 46, 48 are used to invert the logic of the $\overline{9}$ and $\overline{90}$ output line of counter 10. This gates the logic 1 from terminal D to terminal Q of flip-flop 30. Reset line 50 for flip-flop 30 is controlled by an NAND gate 52 which either receives an offset key or pulse in input 54 to reset the flip-flop or a logic on lines 56 and 58 which prevents the clocking pulse in line 34 from stopping counter 10. The logic on line 56 is controlled by a manual switch or switches on coordinator A, which indicate that the coordinator is in free or manual operation. When using the present invention, coordinator A is operated free or manual and a logic 1 appears in line 56. This releases coordinator A to be controlled by lines 54 and 58. When the smooth transition system STS is not to be used, a logic 1 appears in the ST line 58 and counter 10 is started by an offset key pulse in line 54. When the smooth transition system of the present invention is to be used, switch 59 is shifted to place a logic 1 on the ST terminal of smooth transition system STS. This gives a logic O in ST line 58 to hold flip-flop 30 in the reset condition. When this occurs, counter 10 is not stopped by gate 40 and continues to cycle between a first number $N_1$, i.e. zero or $\overline{0}$–$\overline{00}$ and a second number $N_2$, i.e. 99 or $\overline{9}$–$\overline{90}$. A power clear pulse in the POCLR line will reset both sections of decode counter 10.

As input counting pulses P or (:$CLK_2$:) appear at input 12, counter 10 counts between 0 and 99. At the 99 ($\overline{9}$–$\overline{90}$) coded logic in lines *a, b,* flip-flop 30 is clocked to block further operation of counter 10 unless the smooth transition system is in use. This clocking resets the counter to a 0% or $\overline{0}$–$\overline{00}$ condition, awaiting a next pulse in line 32 created by gate 52 upon receipt of an offset key in line 54. When an offset key is created by the offset control circuit D, and when the smooth transition system STS is disabled by switch 59 being shifted to the OFF or ST 1 condition, flip-flop 30 is reset and counter 10 commences to count the next cycle for signalization by the program module C. Module C produces desired outputs at given count positions in background cycle between $N_1$ and $N_2$. These outputs are illustrated as controlling logic on line 1–5.

Referring now to driving circuit B of coordinator A, this circuit includes a pulse input 60 which receives 120 pulses per second which can be created by standard line frequency of 60 cycles and a full rectifier with a pulse shaping circuit. The pulses on input 60 are divided by digital divider circuit 62, which has a dividing function N. In the illustrated embodiment, using 60 cycle, the dividing function N is the cycle length in seconds divided by five. This produces a pulse train in output 64 which is six hundred divided by the cycle length in seconds. Dividing number N is controlled by an appropriate circuit, such as thumbwheel device 70, which is adjusted to read at the panel of coordinator A in cycle length time in seconds. Thus, the cycle length can be adjusted by five second intervals over a wide range of desired cycle lengths for the particular intersection being controlled by coordinator A. Thumbwheel selecting circuit 70 then controls the dividing function N in divider circuit 62. If an external stop time is desired, this can be controlled by a unit 72 which inhibits the operation of divider 62. The stop time can be received by coordinator A from the master controller or from other sources. A pulse train in output 64 is divided by the number six in divider 80, having an input 82 connected to output 64 and an output 84 which is designated as the second clock. This second clock $CLK_2$ has a frequency of 100 divided by the cycle length in seconds. If the available driving line frequency were 50 cycles per second, the input 60 would receive 100 pulses per second. Thus, the output 64 would have a frequency of five hundred divided by the cycle length in seconds. In this instance, divider 80 would divide by five to produce the second clock $CLK_2$ in line 84. A NAND gate 90 is part of the smooth transition system STS of FIG. 2 and gates the clock $CLK_2$ to the input 12 of cycle length counter 10 through inverter 91. The clock $CLK_2$ is received in line 93 which is the output of divider 80. The label :$CLK_2$: indicates that second clock $CLK_2$ has been controlled logically by the logic on input 94 of gate 90. If it is desirable to stop counter 10, this can be done by an appropriate logic at input 94 of gate 90. Gate 90 is used to stop counting of counter 10 for a preselected time to bring the start of a background cycle into synchronization with the offset key when gate 52 is latched and the smooth transition system STS is ON at switch 59. When the smooth transition system is OFF at switch 59, the offset key pulse in line 54 starts the background cycle and forces synchronization irrespective of the offsetting displacement from the end of a prior background cycle.

In operation, as so far described, driving circuit B causes counter 10 to create one hundred pulses during the time set in thumbwheel device 70. Thus, the selected cycle length time is divided by counter 10 into one hundred equal increments which therefore divides the logic shifting in output lines *a, b* into one hundred separate increments which appear as bineary coded information in these lines. This binary coded information is then directed into programmed output module C and also to the smooth transition system STS, which is shown in more detail in FIG. 2. In the illustrated embodiment, a logic 0 appears in the appropriate unit line of group b and the appropriate tens line of group a to indicate the incremented progression of counter 10 in the background cycle between zero ($N_1$) and 99 ($N_2$).

Offset controller selection circuit D produces an offset key or pulse in line 54 at a predetermined time delay after the master synchronizing MS pulse in line MS. The desired offset can be selected from a signal created by the master controller based upon time and/or traffic conditions. In accordance with the illustrated embodiment, the offset control circuit D includes offset selection pulse counter 100, which is the same as counter 10. This second counter has output line groups *c, d* and enabling lines 104, 196. The coded lines of groups *c, d* are connected to a thumbwheel selecting network 110. This network includes, in the preferred embodiment, three manually adjustable, remotely selectable settings for different offsets in background cycle percentages, i.e. counts or count positions in counter 100 after an MS pulse. A signal from the master controller determines which of the thumbwheel units is activated at any given time to select the desired manually selected offset for counter 10. A flip-flop 120 similar to flipflop 30 of counter 10 controls the operations of counter 100. Flip-flop 120 includes a D terminal latched to a logic 1 and a Q output line 122 for controlling the reset lines 104, 106. A clock line 124 is pulsed at the number 99, i.e. $\overline{9}$ and $\overline{90}$. The clock line 124 is controlled by AND gate 130 having inputs 132, 134 in the same operation as lines 42, 44 of gate 40. This counter may also be reset by a power clear pulse POCLR. A reset pulse is received at a master synchronize pulse MS in the MS line. When this pulse occurs, a logic 0 is applied to lines 104, 106 by line 122. In this manner, counter 100 starts to count input counts and pulses received at input 102 from divider 140. This divider has the same dividing number as divider 80 and has an input 142 connected to output 64 of divider 62. Output 144 carries the first clock $CLK_1$ to the input of counter 100. As can be seen the counting frequency of counters 10, 100 are the same. They both receive input counting pulses of the same cycle length determining frequency, under novel circumstances. If a 50 cycle line current were used, dividing circuit 140 would divide by five. In the preferred embodiment, the circuit divides by six. In operation, the master synchronizing pulse is received in the MS line. This starts counter 100, which counts to a thumbwheel setting in offset thumbwheel unit or network 110. The particular thumbwheel unit being used is controlled by an offset select line controlled by the master controller. In other words, three or more offset thumbwheels are adjusted in percentages. Each of these thumbwheel units is controlled by an external pulse so that only one is activated at any given time. When reaching the activated offset thumbwheel setting, an offset key or pulse is created to reset flip-flop 30 when a logic 1 is latched at lines 56, 58. This causes counter 10 to start counting to define a background cycle at the desired offset from the general MS pulse for the control traffic system. After counter 10 counts to the number 99, a logic 1 is clocked into line 32 by a pulse in line 34. The next background cycle length is then again started by an offset key in line 54.

Figure 2:
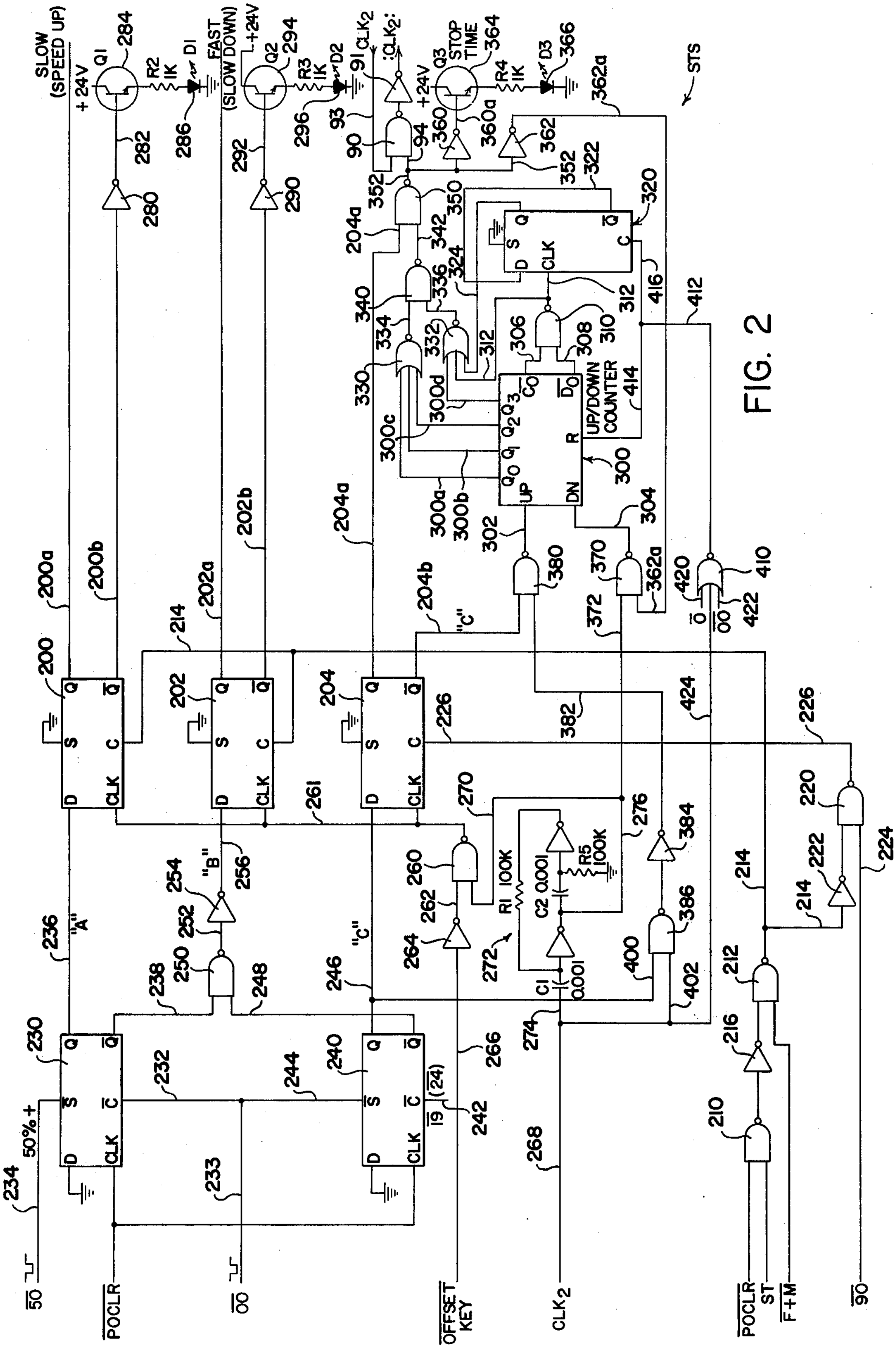
FIG. 2 is a detailed logic diagram illustrating the preferred embodiment of the present invention.

Referring now to FIG. 2, a smooth transition system STS contemplated by the present invention is illustrated. In this preferred embodiment, D-type flip-flops 200, 202, 204 are used to control the input pulses (:$CLK_2$:) at input 12 for primary decade counter 10. These flip-flops have different settings during different percentage values or count positions of the background cycle generated by counter 10 and followed by secondary counter 100. The flip-flop circuits used in the illustrated embodiment of the invention include non-inverted logic at output lines 200*a*–204*a* connected to the Q terminals of the resepctive flip-flop and inverted logic in lines 200*b*–204*b* connected to the $\overline{Q}$ terminals of the flip-flop circuits. These flip-flops include a clocking terminal CLK, a D terminal, a set terminal S and a reset or clear terminal C. To clear the flip-flops, there are provided two separate circuits. The first circuit for clearing flip-flops 200, 202 includes a NAND gate 210 controlled by a $\overline{POCLR}$ pulse and an ST condition. The combined logic of gate 210 and the logic on the $\overline{F+M}$ line control a second NAND gate 212. The first input to this gate is inverted by an inverter 216. The $\overline{POCLR}$ line is a logic 0 when there is a power clear pulse. This is used to clear the flip-flops in various other circuits and to reset the counters 10, 100 when power is first applied to the smooth transition system or coordinator. Under normal circumstances, the logic on the POCLR line is a logic 1. The ST line is at a logic 1 when the smooth transition system is on. Thus, the $\overline{POCLR}$ pulse produces a pulse at the output of inverter 216. When the smooth transition is being used, there is no free or manual operation. Thus, the $\overline{F+M}$ line is at a logic 1. This opens or unlatches gate 212 so that a pulse at the output of inverter 216 pulses line 214 which clears flip-flops 200, 202 to apply a logic 0 at lines 200a, 202a. The second clearing circuit includes a NAND gate 220 having an input inverter 222 for inverting the logic on line 214. The other input 224 is controlled by the $\overline{90}$ line from primary decode counter 10. A negative pulse in the $\overline{POCLR}$ line produces a positive pulse in line 214 and a positive pulse in line 226, assuming that the other inputs to the described gates are at a logic 1. Thus, when the ST line is at a logic 1 indicating that smooth transition system STS is operative, the power clear pulse clears flip-flops 200–204. Consequently, at the start of the operation of the system illustrated in FIG. 2, the control flip-flops are in the CLEAR condition with a logic 0 at the Q terminals. This produces a logic 0 at the $\overline{Q}$ terminals in accordance with standard operation of flip-flops. The flip-flops used in the illustrated embodiment for controlling the operation of counter 10 have a level responsive clear and set operation. Thus, as long as logic 1 appears at the reset or clear terminal C, the flip-flop remains in the clear or reset condition with a logic 0 at the Q terminal. Consequently, when the pulse disappears from the $\overline{POCLR}$ line, all inputs to the reset circuits are a logic 1. This produces a logic 0 at the C terminal of flip-flops 200–204 to condition these flip-flops for operation when the smooth transition system STS is operative as indicated by a logic 1 at the ST line. As a corollary, if the smooth transition system is inoperative, a logic 0 appears at the ST line. This latches a logic 1 in lines 214, 226. Thus, a logic 1 is retained at the C terminal of flip-flops 200–204. This holds these flip-flops at a fixed condition with a logic 0 at the Q terminals. The same effect of locking the circuit shown in FIG. 2 in an operative condition will occur when the coordinator is to be operated in a free or manual mode. In that instance, the $\overline{F+M}$ line shifts to a logic 0. This also produces a latched 1 in lines 214, 226. The remainder of the circuit illustrated in FIG. 2 will be described assuming that a logic 1 appears in input lines $\overline{POCLR}$, ST and $\overline{F+M}$.

To control the logic at the D terminal of flip-flop 200 and partially control the terminal of flip-flop 202, there is provided a control flip-flop 230 having the same terminals as flip-flops 200–204, except that the clear or reset terminal is held at a reset condition with the logic 0 instead of the logic 1 as used in flip-flops 200–204. A logic 1 appears in the reset line 232 controlled by the $\overline{00}$ line 233. Thus, as long as counter 10 is in the $\overline{00}$ condition, a logic 0 is applied to the $\overline{C}$ terminal of flip-flop 230. This will hold flip-flop 230 for ten counts at the start of a background cycle. The flip-flop remains in the reset condition for this length of time together with any extended time until the condition of the flip-flop has been positively shifted by a logic 0 pulse in the set line 234 controlled by the $\overline{50}$ condition from counter 10. Thus, during the $\overline{00}$ condition of counter 10 and until a count of 50 has been reached by counter 10, the A line 236 is at a logic 0. Thus, the $\overline{Q}$ line 238 is at a logic 1. Flip-flop 230 is thus toggled at the initial position of a background cycle to produce a logic 0 at the "A" line and is then shifted to a logic 1 in the "A" line by the $\overline{50}$ condition from counter 10. A second control flip-flop 240 operates similarly to the control flip-flop 230. However, flip-flop 240 is toggled to a SET condition at the start of a background cycle by a logic 0 appearing in line 244 and at the $\overline{S}$ terminal. The set terminals $\overline{S}$ are also controlled by a logic 0 condition instead of a logic 1 condition as used in flip-flops 200–204. A logic 0 appears in the reset line 242 at the $\overline{19}$ position of counter 10. Thus, when the ten's counter is at $\overline{10}$ and the units counter is at $\overline{9}$, a logic 0 pulse appears in line 242. This clears or resets flip-flop 240 to produce a logic 0 in line 246 which is the "C" line. In practice, coordinator A can be used for either 60 cycle operation or 50 cycle operation. In practice, when 50 cycle operation is employed, line 242 is connected to the $\overline{24}$ output of counter 10. Thus, at the twenty-fourth count a logic 0 appears in line 242 to reset or clear flip-flop 240 and produce a logic 0 in line 246. As can be seen, at the start of the background cycle, a logic 0 appears in line 233. This clears flip-flop 230 and sets flip-flop 240. Thus, a logic 0 appears in the "A" line and a logic 1 appears in the "C" line. In this condition, a $\overline{Q}$ terminal of flip-flop 240, which is connected to line 248, is at a logic 0. Thus, NAND gate 250 has a logic 1 output in line 242, which is inverted by inverter 254 to produce a logic 0 in "B" line 256. Thus, after the start of background cycle by counter 10 "A" line 236 is shifted to a logic 0 by the Q terminal of flip-flop 230, "B" line 256 is shifted to a logic 0 by a logic 0 in line 248 and "C" line 246 is at a logic 1 as controlled by the Q terminal of flip-flop 240. This logic condition is shown in FIG. 3 as a "C" condition until after 19% in a 60 cycle operation. Until the tenth count positions in the background cycle of counter 10, line 233 remains at a logic 0. This holds the previously described logic in lines 236, 256, and 246. At tenth count position, line 233 shifts to a logic 1 since counter 10 goes into the $\overline{10}$ condition. Thus, the $\overline{C}$ terminal of flip-flop 230 and the $\overline{S}$ terminal of flip-flop 240 are released. At count position $\overline{19}$, when 60 cycle is used, a logic 0 appears at line 242. This resets or clears flip-flop 240 to produce a logic 0 in "C" line 246. This immediately produces a logic 1 in line 248 connected to the Q terminal of flip-flop 240. Thus, output 252 of gate 250 shifts to a logic 0. This produces a logic 1 in "B" line 256. A logic 0 is retained in "A" line 236. This condition is shown in the "B" portion of FIG. 3 between 19% and 50%. As soon as the twentieth count is recorded by counter 10 in a background cycle, a logic 1 appears in line 242. Flip-flop 240 retains its reset condition with a logic 0 at the Q terminal connected to line 246. At the fiftieth count position, or 50% of the background cycle, which is divided into 100% incremented by a single percent upon each count at terminal 12, the $\overline{50}$ output of counter 10 shifts to a logic 0. This sets flip-flop 230 through line 234 to produce a logic 1 in "A" line 236. At the same time, a logic 0 appears in line 238 at the Q terminal of flip-flop 230. This shifts "B" line 256 to a logic 0 through gate 250. Thus, after 50% of the background cycle, "A" line 236 is a logic 1 and the "B" and "C" lines are at a logic 0. This is also shown in the graph of FIG. 3 after the 50% position. Lines 236, 256 and 246 have a logic which shifts as a background cycle progresses from its first count position $N_1$ to its last count position $N_2$. In this illustrated embodiment, $N_1$ is zero percent, i.e. $\overline{0}$, $\overline{00}$, and $N_2$ is 99%, i.e. $\overline{9}$, $\overline{90}$. Thus, the background cycle used by the program module C is used to control the logic conditions at the D terminals of flip-flops 200, 204 for purposes to be hereinafter described in detail.

To clock flip-flops 200-204 there is provided a clocking NAND gate 260 having an output 261 and an input 262 at the output of inverter 264. A logic 0 offset key pulse in line 266 produces a logic 1 pulse in line 262, as shown in the center graph of FIG. 4. This pulse has a length at least as great as the period of the clock $CLK_2$ at line 268 connected to the output of divider 80. Thus, gate 260 is enabled during an offset key pulse in line 266 for a time sufficient to receive a delayed clock pulse 270 which follows, but is delayed from, the second clock $CLK_2$ pulse in line 268. A variety of arrangements could be provided for producing a slightly delayed pulse train in line 270. In the illustrated embodiment, a one shot circuit or delay circuit 272 is provided. This circuit has an input 274 connected to the clock $CLK_2$ line 268 and an output 276, which is connected to the delayed clocking line 270 of gate 260. This delay is selected so that the delayed pulse in line 276 appears in timed relationship with a clock pulse and between two pulses on the second clock $CLK_2$ in line 268. By providing this delay, logic of the soft transition system shown in FIG. 2 is stabilized before the delay pulse which will clock flip-flops 200–204 at the occurrence of an offset key pulse in line 266. This allows the system to stabilize prior to clocking of the control flip-flops. This delayed concept is also used to produce an accurate synchronizing condition between an offset key pulse and the background cycle being created by counter 10 in a manner to be described later.

Referring now more particularly to FIG. 3, assume that the offset key pulse in line 266 from the thumbwheel select circuit 100 occurs after 50% of the background cycle being created by counter 10, the "A" line equal to a logic 1 condition of FIG. 3 is set into the input side of flip-flops 200–204. In this condition, a clocking pulse in line 261 from gate 260 actuates the speed up circuit, since the background cycle is considered to be slow with respect to the offset key. This circuit can take a variety of structural features; however, in the preferred embodiment of the invention, line **202*a* is shifted to a logic 1 upon clocking of flip-flop 200. This control line is directed to the divide by five control circuit E which causes divider 80 to operate in a divide by five mode. Thus, the frequency of $CLK_2$ is increased to speed up the operation of counter 10, which is controlled by this second clock through gate 90. The same clock is used for the smooth transition circuit STS; therefore, this circuit operates in concurrence with counter 10. The background cycle being created at the output of counter 10** is thus reduced in time length so that the $N_2$ or final count position at 99% occurs more rapidly on the next cycle. This speed up condition continues until synchronization is realized or the offset key occurs in the first 19% of the background cycle.

As is well known, under normal operating conditions the offset key is synchronized with the starting of the background cycle. Thus, a shift to the "A" line equal logic 1 condition in the background would occur upon a master controller substantially changing the offset percentage for use at intersection TI, as shown in FIG. 1. This would happen only occasionally in controlling the total traffic system utilizing coordinator A. However, when this occurs the speed up of the counter produces a gradual synchronization of the offset key with the starting count $N_1$ of the background cycle. After a sufficient number of cycles operating in the increased speed condition, either synchronization is realized or the final synchronization is obtained from operation of the circuit shown in FIG. 2 in the "C" line equal logic 1 condition. Using the "A" operation, the background cycle is speeded up to bring the offset key into the "C" condition. The function of smooth transition system STS in the "C" condition will be described later.

When the background counting cycle is increased in speed and decreased in time length, a logic 0 appears in output **200*b* at the $\overline{Q}$ terminal of flip-flop 200. This signal is inverted by inverter 280 to produce a logic 1 in base lead 282 of transistor switch 284. This lights an LED 286 which is located on the front panel of coordinator A, indicating that the coordinator is in the increased speed mode. This light remains illuminated until flip-flop 200 is toggled to produce a logic 1 in line 202*b*. This reverse biases switch 284 and extinguishes LED 286**.

If the offset key pulse in line 266 occurs during the "B" line equal logic 1 condition shown in FIG. 3, which is between the 19% and 50% count positions of the background cycle, a logic 1 is applied by line 256 to the D terminal of flip-flop 202. Thus, when the offset key produces an output line at 261 a logic 1 occurs in line **202*a*. This slows down the background cycle by initiating the divide by seven control circuit F so that the clock $CLK_2$ is slower in frequency than normal. When this occurs, the background cycle increases even though it is divided into 100% between first count position $N_1$ and second count position $N_2$. By slowing down the background cycle in response to the new position of an offset key pulse with respect to the synchronization pulse MS, the time relationship of the offset key pulse is moved backwardly in the count positions of a background cycle. Again, this shifts the offset key position with respect to the background cycle toward the "C" condition shown in FIG. 3. As in the case of the speed up mode, a logic 1 in line 202*b*** during the slow down mode of operation. This logic is inverted by inverter 290 to produce a logic 1 in base line 292 of transistor switch 294. In this manner, LED 296 is activated to display the slow down mode at the front panel of coordinator A.

As can be seen, if an offset key has been shifted to offset the signal S at intersection TI, the background cycle is either lengthened or shortened to bring the background cycle into synchronization with the offset pulse. Whether the background cycle is speeded up to shift the offset key upwardly in the count positions of the background cycle or slowed down to shift the offset key to a lower percentage or count position, ultimately the offset key is either synchronized with the first count position $N_1$ of the background cycle or is located in the first 19% of the background cycle which is the "C" line equal logic 1 condition, shown in FIG. 3. The program module C operates in accordance with the preselected program during the speed up mode or slow down mode. The only difference is that the signalization caused by the program occurs either more rapidly or more slowly during the time when the background cycle is being adjusted by coordinator A to a new offset condition with respect to the master synchronization pulse in the MS line.

When the offset key pulse in line 226 occurs in the "C" position of the background cycle, whether caused by speeding up the background cycle, slowing down the background cycle, or shifting of the offset signal less than 20% of the background cycle, a clocking pulse in line 261 shifts the logic in line 204a to a logic 1. At the same time, a logic 0 occurs in $\overline{Q}$ line 204b. The logic of these two lines at the output of flip-flop 204 controls the stop, or dwell, gate 90 by producing either a logic 0 or a logic 1 in the latching or enabling input 94 of this gate. When the logic 0 appears at input line 94, the output of gate 90 is latched to a logic 1. The output of inverter 91 is thus latched to a logic 0 and the (:$CLK_2$:) signal is stopped or shifted to a dwell. Thus, clock (:$CLK_2$:) no longer follows the clock $CLK_2$ which is the output of divider 80. This stop or dwell condition causes counter 10 to stop operation and wait for synchronization of the offset key position with respect to the start of the background cycle. In accordance with the preferred aspect of the present invention, this condition is controlled by a standard up/down binary counter 300 which is counted up by pulses in line 302 connected to the UP terminal and counted down by pulses in line 304 connected to the DN terminal. In accordance with standard binary counter practice, the $Q_0$–$Q_3$ terminals are counted up in the binary fashion. Thus, for the first count the logic 1 appears at the $Q_0$ terminal and a logic 0 appears at the $Q_1$–$Q_3$ terminals. For a count of digital fifteen, the terminals $Q_0$–$Q_3$ are all at a logic 1. These terminals are connected to output lines 300a–300d. After these terminals are all counted to a logic 1, the next count in line 302 produces a logic 0 in output line 306 connected to the inverted carry-out terminal $\overline{C_0}$. Thus, the four stage binary counter 300 actually has five separate counting stages and outputs. In counting down from an up count position, pulses appear in line 304. This counts down in binary fashion the internal logic conditions controlling the logic states of the $Q_0$–$Q_3$ terminals. When they have been counted down a number corresponding to the up counting number, a logic 0 appears in the borrow terminal $\overline{D_0}$. This shifts output line 308 to a logic 0 at the zero count position.

If the up count of counter 300 has exceeded a 1111 binary count position, the terminals $Q_0$–$Q_3$ are first counted down to a logic 0. This requires the number of pulses exceeding the 1111 binary count. Thereafter, down counting can continue with the $\overline{C_0}$ terminal shifting to a logic 1 and all terminals $Q_0$–$Q_3$ shifting to a logic 1 again. Fifteen counts are then counted down to give the zero count condition for counter 300. Thus, if the up count has exceeded the capacity of terminals $Q_0$–$Q_3$, the carry-over terminal $\overline{C_0}$ is activated and must be deactivated before a zero count can be reached by counter 300 to shift the logic of the borrow terminal $\overline{D_0}$ and, thus, shift line 308 to a logic 0.

The logic on lines 306, 308 control the output of NAND gate 310 which is connected to the clocking line 312 of flip-flop 320. This flip-flop includes a $\overline{Q}$ terminal connected to a D terminal by line 322. Thus, flip-flop 320 is a bi-stable device alternating between the normal logic 0 at Q terminal and then a logic 1 at the Q terminal. The logic on the Q terminal controls line 324 which combines with clock line 312 and lines 300a–300d to operate NOR gates 330, 332. Outputs 334, 336 of these gates are directed to the input of NAND gate 340 having output 342 connected to NAND gate 350 having an output 352. During any up counting, a logic 1 appears in one input of gates 330, 332. Thus a logic 0 appears in at least one of the input lines 334, 336. This latches gate 340 to a logic 1 in line 342. Thus, stop or dwell control gate 350 has a logic 1 at the input line 342 during any up counting by counter 300. If the offset key pulse has been received during the "C" condition, as shown in FIG. 3, a logic 1 appears in line 204a which is a first control means and is used in stopping counter 10. A logic 1 in line 204a combines with a logic 1 in line 342 indicating an up count has occurred before the offset key. This produces a logic 0 in line 352. This logic condition applies a logic 0 to control line or input 94 and latches gate 90 to a logic 1 output. Thus, clock (:$CLK_2$:) is latched at a logic 0 and counter 10 is in the dwell or stop condition. Thus, if the offset key occurs in the first 19% of the background cycle when there has been an up count indicating that the offset key is displaced from the zero count position or 0% condition of the background cycle, there is a dwell condition established and counter 10 is stopped until released by NAND gate 350.

The logic on output line 352 of control gate 350 is directed to the input of inverters 360, 362 having output lines 360a, 362a. Output line 360a controls the bias on transistor switch 364 connected in series with LED 366. Thus, when a logic 0 appears in line 352 to stop counter 10, a logic 1 appears in line 360a to forward bias switch 364. This activates LED 366 to display the dwell condition on the front panel of coordinator A. At the same time, a logic 1 also appears in line 362a at the output of inverter 362. This line controls the actuation of a down counting gate 370 having a second input 372 connected to the delayed clock line 276. Thus, whenever coordinator A is in the dwell condition caused by at least some up counting by counter 300 when the offset key occurs in the "C" position of a background cycle, down counting gate 370 is activated.

The activation of the down counting gate 370 has occurred because of a logic 1 being clocked into line 204a. This can occur only if there has been some up counting which is controlled by the up counting gate 380 having an input 382 controlled by inverter 384 at the output of NAND gate 386. This NAND gate is controlled by a logic on input lines 400 connected to line 246 and line 402 connected to the second clock line 268. The toggle aspect and control of counter 300 for up counting and then down counting is now quite evident. When flip-flops 230, 240 indicate that the background cycle is within the first 19%, line 246 is at a logic 1. Flip-flop 204 has been cleared by line 226 at the 90% position of the previous background cycle. Thus, a logic 0 appears in line 204*a* and a logic 1 appears in line 352. This allows counting of counter 10 through input 12. Also, this condition allows up counting during the "C" portion of the background cycle because line 204*b* connected to up counting gate 380 is at a logic 1. This up counting is through gate 386 which is unlatched because a logic 1 is in line 400. Thus, the clock $CLK_2$ in line 268 causes pulses in line 402 and in line 382. Since a logic 0 is at output 204*a*, a logic 1 is in the $\overline{Q}$ output 204*b*. This opens the up counting gate 380 to allow up counting pulses corresponding to the $CLK_2$ pulses in line 302. Consequently, as soon a flip-flop 240 is set at zero position of a new background cycle, counter 300 starts counting in a upward direction. No down counting can occur since line 362*a* is at a logic 0. Thus, the down counting gate 370 is deactivated. During this up counting, line 204*a* is at a logic 0 and counter 10 operates in a normal condition.

If an offset key does not occur during the first 19% of the background cycle, line 246 shifts to logic 0 at the 19% count position, or at the 24% count position when 50 cycle input is used. This latches control gate 386 to prevent further counting through gate 380. There can be no down counting since line 204*a* cannot be subsequently shifted to a logic 1 with a logic 0 being at the D terminal of flip-flop 204. Thus, the up counting during the first 19% of the background cycle is stored in counter 300. At start of the next cycle, gate 410 causes a logic 1 in line 412 to reset timer 300 and flip-flop 320 by lines 414, 416, respectively. Gate 410 is operated by input lines 420, 422 and 424. Line 420 is connected to the $\overline{0}$ line of counter 10. In a like manner, line 422 is connected to the line $\overline{00}$ of counter 10. At start of a subsequent background cycle, these two terminals are shifted to logic 0. The next clocking pulse for counter 10 then shifts line 424 to logic 0 to create the resetting pulse in line 412. Thus, when there was no offset key in the "C" portion of the background cycle, the next cycle resets counter 300 and flip-flop 320 to the logic 0 condition. All inputs to gates 330, 332 are logic 0 to produce logic 1 in both lines 334, 336. This produces a logic 0 in line 342 and a logic 1 at the output of gate 350. As soon as the reset condition has disappeared, up counting of counter 300 occurs as previously described. Thus, the up counting occurs on the first pulse which shifts counter 10 to the $\overline{1}$ and $\overline{00}$ condition.

Assume now that an offset key does occur during the "C" portion of the background cycle, after a given number of counts have been recorded in the up count section of counter 300. The offset key pulse in line 266 causes the delay pulse of line 270 to clock flip-flops 200–204. This will clock the logic 1 from line 246 into line 204*a*. This logic 1 is directed to one input of gate 350. If there has been no count by timer 300, the offset key occurs at the 0% of the background cycle. This is synchronization and logic 0 will appear in line 342. Thus, the logic 1 in line 204*a* will have no effect upon the operation of counter 10. A logic 1 will be retained at output 352. Assume now that there has been a number of counts by counter 300 which indicates that the offset key is not synchronized with the 0% or $N_1$ count position of the background cycle being generated by counter 10. In this situation, line 342 will have shifted to logic 1 because there is a logic 1 on one of the inputs of gates 330, 332. When there has been a count and the offset key occurs during the "C" portion of the background cycle, gate 350 is shifted to a logic 0 at line 352. This causes the counter 10 to dwell as gate 90 is latched by a logic 0 in input 94. At the same time, down counting gate 370 receives a logic 1 in line 362. Up counting gate 380 has received a logic 0 in line 204*b* and is latched to a non-counting condition. Delayed pulses in line 372 start counting counter 300 in a down direction. As soon as the counter has counted down the same number of counts which were up counted, the inputs to gates 330, 332 are all a logic 0. Thus, the logic 0 appears in line 342 and gate 350 is shifted to produce the logic 1 in line 352. This starts counter 10 at a synchronized position so that the next offset key will occur at the $\overline{0}$, $\overline{00}$ position of the next background cycle. As long as this synchronization condition remains, the circuit shown in FIG. 2 is not operative to effect the counting function of counter 10. If the offset key is shifted by the master controller or synchronization is not realized for another reason in a subsequent background cycle being counted by counter 10, the circuit shown in FIG. 2 is activated if coordinator A is in the smooth transition mode of operation.

If the up count exceeds fifteen, line 306 shifts to logic 0 at the count after the $Q_0$–$Q_3$ lines are at binary 1111. This places a logic 1 immediately in line 312 forming one input to gate 332. This logic 1 retains the logic 1 in line 342. At the same time, flip-flop 320 is clocked by the logic of line 312 to produce a logic 1 in line 325. This logic 1 is retained until either a reset has occurred or down counting is caused by a subsequent offset key during the latter portion of the "C" portion of the background cycle. In this instance, as gate 370 counts down, line 306 remains at logic 0 until the down counting has removed counts in excess of the counts to give terminals $Q_0$–$Q_3$ a binary 1111 condition. At that time, line 306 shifts to a logic 1 to remove the logic 1 from line 312. The next down count shifts all terminals $Q_0$–$Q_3$ to a logic 1 condition and the terminal $\overline{D}_0$ shifts to a logic 0. This clocks flip-flop 320 by line 312 to give a logic 0 in line 324. As down counting continues, the logic of $\overline{D}_0$ shifts to a logic 1 to remove the logic 1 from line 312. Then counting is down to a logic 0 which causes all lines 30*a*–30*d* to be a logic 0. This stops the down counting and starts counter 10. If the up counting does not require a fifth stage as created by flip-flop 320, the up counting affects only the logic on lines 300*a*–300*b*. After full down counting of counter 300, the logic of lines 300*a*–300*d* is shifted to a logic 0 to stop the dwell condition of counter 10. Representative operation of counter 300 is illustrated in FIG. 5. In this illustration, the offset key occurs after a fourth count has been received in the counting operation. The delayed fourth pulse thus shifts flip-flop 204 to cause down counting. Down counting occurs for four delayed pulses which occur after the eighth nondelayed pulse of the $CLK_2$ clock in line 276. Thus, the up counting has occurred for four pulses of clock $CLK_2$ and down counting has occurred for a like number of counts. Thus, the background cycle to be subsequently counted by counter 10 will be synchronized with the position of the offset key.

If the offset key pulse is shifted to a position beyond 19% for a 60 cycle operation, clock $CLK_2$ will have a varied frequency according to the location of the offset key with respect to the count position of the background cycle. As the offset key pulse approaches synchronization with the start of the background cycle, the offset key will occur during the "C" portion of the background cycle. This is assured because of the low change in frequency for adjusting the relative position of the background cycle with respect to the offset key selected by the master controller at the thumbwheel unit 110.

From the above description of the preferred embodiment of the invention, it is noted that irrespective of the shift in the offset key pulse with respect to the existing background cycle, there will be an abrupt change in the background cycle only to the extent of approximately 19% of the background cycle. Any adjustment beyond the 19% position will require more than one background cycle operation to gradually shift the offset key into the 19% portion of the background cycle where it is then shifted forcibly into a synchronization condition. Of course, the 19% could be modified and in practice it is as high as approximately 25% for 60 cycle operation and 30% for 50 cycle operation.

When counter 10 is in either the speed-up mode or the slow-down mode, it remains in that mode until the offset key pulse in line 266 occurs at a time which will create a different condition. In other words, as long as the offset key occurs during the "A" portion of the background cycle, clocking of flip-flops 200, 202 by line 261 does not change the input frequency to the counter used in speeding up the counting. The same is true if the offset key is located in the "B" portion of the background cycle, as shown in FIG. 3. As soon as the offset signal occurs in the "C" range after a speed up or slow down, offset cycle is placed in dwell until actual synchronization.

Various modifications may be made in the preferred embodiment of the invention without departing from the intended spirit and scope of the invention.

Having thus defined the invention, it is claimed:

1. In a digital coordinator for creating a background cycle defined by a series of control pulses repeatedly cycled between a first number, $N_1$, and a second number, $N_2$, with the time space between the $N_1$ control pulse and the $N_2$ control pulse being a background cycle length, said coordinator comprising a primary pulse counter means incremented by input counting pulses for creating one in a series of said control pulses in response to a selected number of input counting pulses, said input counting pulses having a frequency for determining the cycle speed of progression of said control counts in successive count positions between the $N_1$ control pulse and the $N_2$ control pulse of a given background cycle, and shifting means for shifting said $N_1$ control pulse with respect to time to correspond in time with a signalization offset signal, the improvement comprising: said shifting means including a counting circuit for counting count pulses created by and corresponding to said input counting pulses during a given background cycle and from a selected count position in said given cycle; a response means for creating a control logic signal in response to a signalization offset signal occurring before a given count position in said given cycle; first means responsive to said control logic signal for creating a stop signal; second means responsive to said control logic signal for storing the number of count pulses counted by said counting circuit prior to said offset signal; means responsive to said stop signal for preventing said counting pulse from incrementing said primary counting means; and, means for holding said stop signal for a time controlled by said number of count pulses.

2. The improvement as defined in claim 1 wherein said counting circuit is the up counting section of a binary up/down counting circuit; said storing means includes the stored count condition of said up/down counter; and said holding means includes the down counting section of said up/down counter, means for decrementing said up/down counter from said stored count number by down counting pulses created by and corresponding to said input counting pulses after said offset signal, means for creating an output signal when said up/down counter is counted down a number corresponding to said stored number of count pulses, and means responsive to said output signal for releasing said stop signal.

3. The improvement as defined in claim 2 wherein said selected count position is less than about 25% of the count increments between $N_1$ and $N_2$.

4. The improvement as defined in claim 3 wherein said response means is a flip-flop with an output and having a first clockable logic condition during said given cycle until said given count position is exceeded and another clockable logic condition at other count positions of said given cycle, means for clocking the existing one of logic conditions to said output in response to an offset signal; and said first and second means being responsive to only said first clockable logic condition at said output.

5. The improvement as defined in claim 4 including a pulse circuit including means for creating said one of said count pulses with each of said input counting pulses.

6. The improvement as defined in claim 5 wherein said pulse circuit includes means for creating one of said down counting pulses with each of said input counting pulses.

7. The improvement as defined in claim 6 including delay means for delaying said down counting pulse with respect to said count pulse for each of said input counting pulses.

8. The improvement as defined in claim 2 including a pulse circuit including means for creating said one of said count pulses with each of said input counting pulses.

9. The improvement as defined in claim 8 wherein said pulse circuit includes means for creating one of said down counting pulses with each of said input counting pulses.

10. The improvement as defined in claim 9 including delay means for delaying said down counting pulse with respect to said count pulse for each of said input counting pulses.

11. The improvement as defined in claim 2 including means for changing said selected frequency of said input counting pulses to a different frequency in response to a signalization offset signal occurring after said given count position.

12. The improvement as defined in claim 11 wherein said frequency changing means includes first means for changing said selected frequency to a first different frequency in response to a signalization offset signal occurring after said given count position and before a selected count position between said given count position and said $N_2$ count control pulse and second means for changing said selected frequency to a second different frequency in response to a signalization offset signal after said selected count position in said background cycle.

13. The improvement as defined in claim 12 wherein one of said different frequencies is greater than said selected frequency and the other of said different frequencies is less than said selected frequency.

14. The improvement as defined in claim 2 wherein said selected count position is at the $N_1$ control pulse.

15. The improvement as defined in claim 1 wherein said selected count position is less than about 25% of the count increments between $N_1$ and $N_2$.

16. The improvement as defined in claim 15 wherein said selected count position is at the $N_1$ control pulse.

17. The improvement as defined in claim 15 including means for changing said selected frequency of said input counting pulses to a different frequency in response to a signalization offset signal occurring after said given count position.

18. The improvement as defined in claim 17 wherein said frequency changing means includes first means for changing said selected frequency to a first different frequency in response to a signalization offset signal occurring after said given count position and before a selected count position between said given count position and said $N_2$ count control pulse and second means for changing said selected frequency to a second different frequency in response to a signalization offset signal after said selected count position in said background cycle.

19. The improvement as defined in claim 18 wherein one of said different frequencies is greater than said selected frequency and the other of said different frequencies is less than said selected frequency.

20. The improvement as defined in claim 1 including means for changing said selected frequency of said input counting pulses to a different frequency in response to a signalization offset signal occurring after said given count position.

21. The improvement as defined in claim 20 wherein said frequency changing means includes first means for changing said selected frequency to a first different frequency in response to a signalization offset signal occurring after said given count position and before a selected count position between said given count position and said $N_2$ count control pulse and second means for changing said selected frequency to a second different frequency in response to a signalization offset signal after said selected count position in said background cycle.

22. The improvement as defined in claim 21 wherein one of said different frequencies is greater than said selected frequency and the other of said different frequencies is less than said selected frequency.

23. The improvement as defined in claim 1 wherein said selected count position is at the $N_1$ control pulse.

24. The improvement as defined in claim 1 wherein said response means is a flip-flop with an output and having a first clockable logic condition during said given cycle until said given count position is exceeded and another clockable logic condition at other count positions of said given cycle, means for clocking the existing one of logic conditions to said output in response to an offset signal; and said first and second means being responsive to only said first clockable logic condition at said output.

25. The improvement as defined in claim 24 wherein said selected count position is less than about 25% of the count increments between $N_1$ and $N_2$.

26. The improvement as defined in claim 25 including a pulse circuit including means for creating said one of said count pulses with each of said input counting pulses.

27. The improvement as defined in claim 26 wherein said pulse circuit includes means for creating one of said down counting pulses with each of said input counting pulses.

28. The improvement as defined in claim 27 including delay means for delaying said down counting pulse with respect to said count pulse for each of said input counting pulses.

29. The improvement as defined in claim 24 including a pulse circuit involving means for creating said one of said count pulses with each of said input counting pulses.

30. The improvement as defined in claim 29 wherein said pulse circuit includes means for creating one of said down counting pulses with each of said input counting pulses.

31. The improvement as defined in claim 30 wherein said pulse circuit includes means for creating one of said down counting pulses with each of said input counting pulses.

32. In a digital coordinator for creating a background cycle defined by a series of control pulses repeatedly cycled between a first number $N_1$, and a second number, $N_2$, with the time space between the $N_1$ control pulse and the $N_2$ control pulse being a background cycle length, said coordinator adapted to receive a signalization offset signal to establish the time position of the $N_1$ control pulse, the improvement comprising: means for digitally measuring the time period between said $N_1$ control pulse and the occurrence of one of said signalization offset signals during a given background cycle and means for stopping said control pulses for said measured time period.

33. The improvement as defined in claim 32 wherein said digital measuring means is a binary counter and means for directing counting pulses of a given frequency to said counter after said $N_1$ control pulse and until said offset signal whereby said final count of said counter indicates said measured time period.

34. The improvement as defined in claim 33 wherein said stopping means includes counting means for counting said counting pulses and means for stopping said control pulses when said counting means counts to a fixed position with respect to said final count.

35. The improvement as defined in claim 34 wherein said binary counter is a binary up counter circuit and said counting means is a binary down counter circuit.

36. The improvement as defined in claim 35 including a pulse creating circuit having a clock input pulsing signal with a series of equally spaced time pulses, first means for creating one of said counting pulses of said binary counter from one of said time pulses and second means for creating one of said counting pulses for said counting means and means for delaying said second mentioned counting pulses 37. The improvement as defined in claim 34 including a pulse creating circuit having a clock input pulsing signal with a series of equally spaced time pulses, first means for creating one of said counting pulses of said binary counter from one of said time pulses and second means for creating one of said counting pulses for said counting means and means for delaying said second mentioned counting pulses.

* * * * *